Patented Sept. 9, 1952

2,610,210

UNITED STATES PATENT OFFICE 2,610,210

HALO - HYDROXY - NAPHTHOYL - ALKANOIC ACIDS AND THE PRODUCTION THEREOF

Robert R. Burtner, Skokie, and John M. Brown, Chicago, Ill., assignors to G. D. Searle & Co., Chicago, Ill., a corporation of Illinois No Drawing. Application March 4, 1949, Serial No. 79,732

10 Claims. (Cl. 260—520)

This invention relates to halogenated hydroxy-naphthoylalkanoic acids, to salts thereof and to methods for producing such acids and salts. In particular this invention relates to acids of the general structural formula

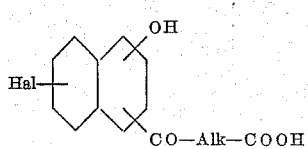

wherein Alk is an alkylene radical containing two to eight carbon atoms and Hal is halogen, and wherein the hydroxyl and ketoalkanoic acid radicals are attached to the same ring or to different rings.

In the foregoing structural formula Alk represents a bivalent, saturated, aliphatic, hydrocarbon radical derived from a straight-chained or branch-chain aliphatic hydrocarbon. Alk therefore includes radicals such as ethylene, propylene, butylene, amylene, as well as polymethylene radicals such as trimethylene, tetramethylene, hexamethylene, heptamethylene, and octamethylene.

The compounds of this invention can be prepared by reacting a halogenated alkoxynaphthalene of the formula

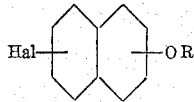

wherein R represents a lower alkyl radical and Hal represents a halogen atom, and wherein the substituents may be on the same or different rings, with an acid anhydride or halide derived from a saturated aliphatic dibasic acid containing 4 to 10 carbon atoms, in the presence of a Friedel-Crafts catalyst in an inert organic solvent. Catalysts which are suitable for such reactions include anhydrous aluminum chloride, anhydrous aluminum bromide, anhydrous aluminum-sodium chloride, anhydrous ferric chloride, stannic chloride, boron trifluoride, anhydrous zinc chloride, hydrogen fluoride, and related substances. Inert solvents which are suitable for these condensation reactions include nitrobenzene, chlorobenzene, carbon disulfide, tetrachloroethane, and related solvents. Among the dibasic acid anhydrides and halides which can be used in the foregoing processes to prepare the substances of this invention are those derived from succinic, adipic, pimelic, suberic, sebacic, ethylsuccinic, glutaric, α-methylglutaric, β-methylglutaric, α-methyladipic and related dibasic acids.

Representative of the compounds which comprise our invention are the following:

A. β-(2-hydroxy-6-bromo-1-naphthoyl)propionic acid

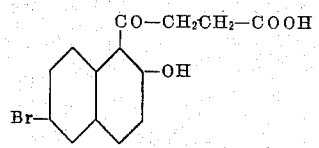

B. δ-(2-hydroxy-3-chloro - 1 - naphthoyl)valeric acid

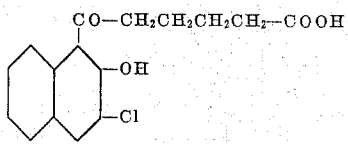

C. β-(4-hydroxy-3-bromo-1 - naphthoyl)propionic acid

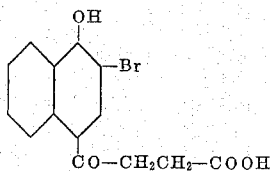

D. γ-(4-hydroxy-5-chloro - 1 - naphthoyl)isovaleric acid

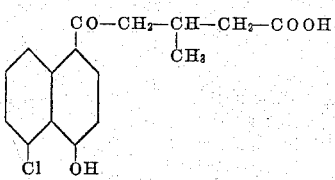

E. β-(2 - hydroxy-1-chloro-6-naphthoyl)propionic acid

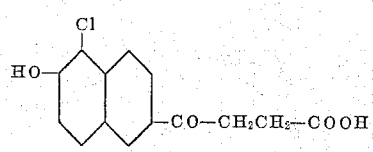

F. ω-(2-hydroxy-1 - bromo-6 - naphthoyl)pelargonic acid

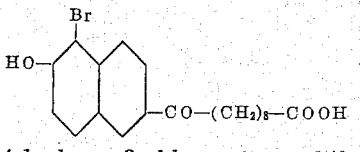

G. δ-(4-hydroxy-3-chloro - 1 - naphthoyl)propionic acid

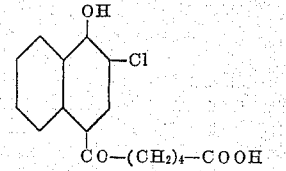

H. δ-(2-hydroxy-6-bromo-1-naphthoyl)valeric acid.

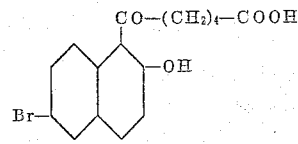

The compounds of this invention are useful as therapeutic agents. They are also valuable as intermediates in the synthesis of complex organic compounds. The compounds are also of use as antiseptics, mold inhibitors, fungicides, and as components of insecticides.

Salts of the acids which comprise our invention may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of a base. The salts are often insoluble in the alcohol and may be obtained as precipitates. In other cases another solvent such as ether or benzene may be added to throw down the salts. Salts of ammonia or aliphatic amines may be obtained by treating a solution of the acid in an organic solvent with a solution of the amine in a similar solvent and precipitating the desired salt with another miscible solvent in which the salt is insoluble. Water-soluble amines are preferred for salt formation, among them being the lower alkyl, dialkyl and trialkylamines as well as alkanolamines.

This invention is further disclosed by the following examples which are provided for the purpose of illustrating the invention and are not to be construed as limiting the invention in spirit or scope. It will be apparent to those skilled in the art that many modifications may be made in the processes, as well as in the claimed compounds, without departing from the intent and purpose of this invention. Amounts of materials are given in parts by weight.

Example 1

A solution of 32 parts of bromine in 100 parts of glacial acetic acid is added during 45 minutes to a stirred suspension of 48.8 parts of β-(1-hydroxy-4-naphthoyl)propionic acid in 488 parts of glacial acetic acid at 60° C. After the addition the reaction mixture is cooled to about 20° C., agitated for 30 minutes and then stripped of acetic acid under vacuum. The residue partially crystallizes on standing. It is triturated with cold benzene, filtered and washed with cold benzene. The crystalline acid is recrystallized from toluene using decolorizing charcoal.

A suspension of 56 parts of the above acid and 25 parts of fused sodium acetate is refluxed in 200 parts of glacial acetic acid for 30 minutes. The reagents pass into the solution within a few minutes. The hot mixture is poured into 1500 parts cold water. The precipitate of β-(1-hydroxy-2-bromo-4-naphthoyl)propionic acid (Compound C) is collected on a filter, dried, and then crystallized from acetic acid with decolorizing charcoal. A second recrystallization from absolute ethanol gives light yellow crystals melting with decomposition at 190° C.

Example 2

To an agitated suspension of 58.5 parts of anhydrous aluminum chloride in 200 parts of nitrobenzene at 2–5° C. is added in small portions an intimate mixture of 22 parts of succinic anhydride and 47 parts of 2-bromo-6-methoxynaphthalene, the temperature being kept below 5° C. The mixture is agitated for 2 hours at 2–5° C. after the addition and then allowed to stand at room temperature for 110 hours. It is then decomposed by addition to 500 parts of ice and 60 parts of concentrated hydrochloric acid. The solvent is removed by steam distillation. The residue is chilled and the precipitate is separated by decantation and dissolved in 500 parts of hot 10% sodium carbonate solution. The hot solution is heated with decolorizing charcoal and filtered and the chilled filtrate is acidified. The solid acid is collected on a filter, washed and dried. It consists of a mixture of β-(2-methoxy-6-bromo-1-naphthoyl)propionic and β-(2-hydroxy-6-bromo-1-naphthoyl)propionic acids. It melts at 135–150° C. Recrystallization from 50% alcohol and from ethyl acetate gives the pure β-(2-hydroxy-6-bromo-1-naphthoyl)propionic acid (Compound A), which melts at 164–165° C. with softening from 185° C.

Example 3

510 parts of anhydrous aluminum chloride are added in one batch to an agitated suspension of 255 parts of β-(1-chloro-2-methoxy-6-naphthoyl)propionic acid in 2000 parts of chlorobenzene. The agitated mixture is heated slowly to 90° C. and kept at approximately that temperature for an hour. The mixture is quenched in an excess of ice and muriatic acid, the solvent is removed by steam distillation and the residue is chilled and filtered. The solid residue of crude β-(1-chloro-2-hydroxy-6-naphthoyl)propionic acid (Compound E) is taken up in 15,000 parts of water at 85° C. containing 200 parts of sodium carbonate. The hot solution is treated with activated charcoal, filtered hot and the filtrate is chilled. The filtrate is then added slowly to an excess of dilute acid. The granular yellow precipitate of β-(1-chloro-2-hydroxy-6-naphthoyl)propionic acid is removed, washed with water and dried. It melts at 188–190° C. Recrystallization from 50% aqueous alcohol or from methanol or ethyl acetate does not raise the melting point.

Example 4

A solution of 79 parts of 1-methoxynaphthalene and 49 parts of maleic anhydride in 600 parts of freshly distilled sym-tetrachloroethane at about 0° C. is treated with 133 parts of anhydrous aluminum chloride over a period of about 40 minutes. After the addition the mixture is stirred at about 0° C. for two hours and then let stand for several days at this temperature. The reaction mixture is poured into an excess of ice and hydrochloric acid and the solvent is removed by steam distillation. The residue is chilled and the precipitate is removed by filtration and dissolved in 2000 parts of hot water containing 80 parts of sodium carbonate. The hot solution is treated with decolorizing charcoal and filtered. The chilled filtrate is acidified and the granular precipitate of β-(1-methoxy-4-naphthoyl)acrylic acid is removed and dried. After recrystallization from ethanol followed by recrystallization from isopropanol or acetic acid using decolorizing charcoal this acid melts at 204° C. with decomposition. Further recrystallization from ethyl acetate gives a product melting at 207° C. with decomposition.

Example 5

64 parts of pyridine are added to a solution of 70 parts of crotonyl chloride in 220 parts of benzene at room temperature. Then a solution of 95 parts of α-naphthol in 220 parts of benzene is added to the above solution with good agitation over a period of about 10 minutes. The temperature of the reaction rises to about 65° C. After this reaction subsides the mixture is refluxed and agitated for five hours. It is then chilled and 1000 parts of cold water containing 96 parts of concentrated hydrochloric acid are added. The organic layer is separated, diluted with ether, washed with dilute hydrochloric acid, and then with dilute sodium hydroxide solution. The organic solution is then washed with water, dried, and evaporated. The residue of α-naphthyl crotonate is distilled at 144–149° C. at 0.6 mm. pressure. On standing this ester crystallizes. On recrystallization from petroleum ether it melts at 27° C.

A solution of 48 parts of α-naphthyl crotonate in 270 parts of nitrobenzene at 0° C. is reacted with 41 parts of anhydrous aluminum chloride at 2–4° C. over a 20 minute period with good agitation. After the addition the mixture is stirred for three hours at 0° C. and 16 hours at 10° C. It is then poured into an excess of ice and acid. The solvent is removed by steam distillation. The residue is chilled and the viscous product is separated by decantation. This product is dissolved in 2000 parts of 2% sodium hydroxide solution at room temperature, filtered with decolorizing charcoal, and the filtrate acidified. The precipitate so formed granulates on standing. It is removed, dried, and crystallized from benzene using decolorizing charcoal. It forms colorless crystals melting at 125–125.5° C.

*Example 6*

To an agitated mixture of 33 parts of succinic anhydride and 80 parts of 1-bromo-2-methoxy-naphthalene in 400 parts of nitrobenzene at 0–2° C. are added over a period of 30 minutes 88.5 parts of anhydrous aluminum chloride. The mixture is agitated at about 0° C. and then left at room temperature for about 15 hours. It is quenched in an excess of ice and acid and the solvent is removed by steam distillation. The organic residue is dissolved in 2000 parts of hot water containing 40 parts of potassium carbonate, treated with decolorizing charcoal, filtered and the filtrate chilled. The resulting solution is poured into an excess of dilute acid. The precipitate is removed and dried. It is extracted repeatedly with boiling methanol. The residue from the methanol extraction is then recrystallized several times from acetic acid, forming buff-colored, thick needles of β-(1-bromo-2-methoxy-6-naphthoyl)propionic acid melting at 209° C. with decomposition.

27 parts of the foregoing β-(1-bromo-2-methoxy-6-naphthoyl)propionic acid are demethylated in 200 parts of chlorobenzene with 51 parts of anhydrous aluminum chloride, according to the method of Example 3. After quenching of the reaction mixture, followed by extraction with dilute potassium carbonate solution, acidification and drying, there is obtained β-(2-hydroxy-1-bromo-6-naphthoyl)propionic acid. It may be purified by recrystallization from aqueous alcohol.

*Example 7*

56.5 parts of adipic anhydride are condensed with 94 parts of 2-bromo-6-methoxynaphthalene at 0–5° C. in 400 parts of nitrobenzene with 117 parts of anhydrous aluminum chloride. The reaction is carried out and the δ-(2-methoxy-6-bromo-1-naphthoyl)valeric acid is isolated as in Example 2. This acid is demethylated by treatment with anhydrous aluminum chloride in chlorobenzene by the procedure of Example 3. δ-(2-hydroxy-6-bromo-1-naphthoyl)valeric acid (Compound H) is isolated by solution in dilute sodium carbonate solution, treatment with decolorizing charcoal, filtration, acidification, and removal. It can be purified by recrystallization from alcohol.

We claim:

1. A halo-hydroxy-naphthoylalkanoic acid, wherein the alkanoic acid moiety contains from three to nine carbon atoms and wherein the halo substituent is a halogen atom of atomic number greater than 9 and less than 53.

2. A halo-hydroxy-naphthoylalkanoic acid, wherein the acid has the formula

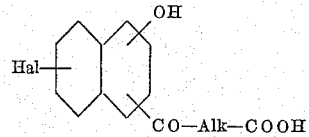

wherein Hal is a halogen atom of atomic number greater than 9 and less than 53 and Alk is an alkylene radical containing from two to eight carbon atoms.

3. A halo-hydroxy-naphthoylpropionic acid wherein the halo substituent is a halogen atom of atomic number greater than 9 and less than 53.

4. A halo-hydroxy-naphthoylpropionic acid, wherein the hydroxyl radical is attached to the same ring as the keto-propionic acid group wherein the halo substituent is a halogen atom of atomic number greater than 9 and less than 53.

5. A bromo-hydroxy-naphthoylpropionic acid, wherein the hydroxyl radical is attached to the same ring as the keto-propionic acid group.

6. A chloro-hydroxy-naphthoylpropionic acid, wherein the hydroxyl radical is attached to the same ring as the keto-propionic acid group.

7. β-(1-hydroxy-6-bromo-1-naphthoyl)propionic acid.

8. β-(4-hydroxy-3-bromo-1-naphthoyl)propionic acid.

9. A halo-hydroxy-naphthoylpropionic acid, wherein the halogen is attached to same ring as the hydroxyl radical and is a halogen atom of atomic number greater than 9 and less than 53.

10. β-(1-chloro-2-hydroxy-6-naphthoyl)propionic acid.

ROBERT R. BURTNER.
JOHN M. BROWN.

REFERENCES CITED

The following references are of record in the file of this patent:

UNITED STATES PATENTS

| Number | Name | Date |
| --- | --- | --- |
| 1,889,347 | Bruson | Nov. 29, 1932 |
| 2,423,709 | Knott | July 8, 1947 |

OTHER REFERENCES

Geigy: Beilstein (Handbuch der Org. Chem., 4th ed.), vol. 10, sup., pp. 479 (1932).

Fries et al.: Beilstein (Handbuch, 4th ed.) 2nd sup., vol. 10, p. 701 (1949).